United States Patent [19]

Mima

[11] E Re. 31,594

[45] Reissued Jun. 5, 1984

[54] METHOD AND APPARATUS FOR SPLICING SPUN YARNS

[75] Inventor: Hirosi Mima, Joyo, Japan

[73] Assignee: Murata Kikai Kabushiki Kaisha, Kyotoshi, Japan

[21] Appl. No.: 349,075

[22] Filed: Feb. 16, 1982

Related U.S. Patent Documents

Reissue of:

[64] Patent No.: 4,263,775
Issued: Apr. 28, 1981
Appl. No.: 79,489
Filed: Sep. 27, 1979

[51] Int. Cl.[3] ..... D01H 15/00

[52] U.S. Cl. ..... 57/22; 57/261; 57/263; 242/37 A

[58] Field of Search ..... 57/22, 261, 263, 1, 57/301, 302; 242/35.5 R, 35.5 A, 35.6 R, 37 A, 147 A

[56] References Cited

U.S. PATENT DOCUMENTS

| | | | |
|---|---|---|---|
| 2,515,172 | 7/1950 | Abbott | 57/22 |
| 3,315,458 | 4/1967 | Alexander | 57/22 |
| 3,461,661 | 8/1969 | Irwin et al. | 57/22 X |
| 3,474,615 | 10/1969 | Irwin et al. | 57/22 X |
| 3,487,618 | 1/1970 | Arguelles | 57/22 |
| 3,599,886 | 8/1971 | Koller | 242/35.5 R |
| 3,732,678 | 5/1973 | Berry | 57/22 |
| 3,867,810 | 2/1975 | Meertens et al. | 57/22 X |
| 3,903,680 | 9/1975 | Isern | 57/22 |
| 3,949,946 | 4/1976 | Rohner et al. | 242/35.6 X |
| 4,121,409 | 10/1978 | Uchida et al. | 57/22 |
| 4,170,103 | 10/1979 | Norris et al. | 57/22 X |
| 4,240,247 | 12/1980 | Matsui et al. | 57/22 X |

FOREIGN PATENT DOCUMENTS

| | | | |
|---|---|---|---|
| 2444973 | 4/1975 | Fed. Rep. of Germany | 242/147 A |

*Primary Examiner*—Donald Watkins
*Attorney, Agent, or Firm*—Spensley, Horn, Jubas & Lubitz

[57] ABSTRACT

Method and apparatus for splicing the ends of spun yarn includes means for inserting the yarn ends into a hole associated with a splicing nozzle having one or more air jet pipes, in which hole the ends are subjected to an air jet to join them each other. Yarn end control nozzles for the yarn on the package side and the yarn on the bobbin side are disposed at each end of the splicing nozzle to suck the yarn ends in the corresponding yarn end control nozzles, respectively and to keep the yarn ends free therein.

29 Claims, 15 Drawing Figures

FIG. 6-A
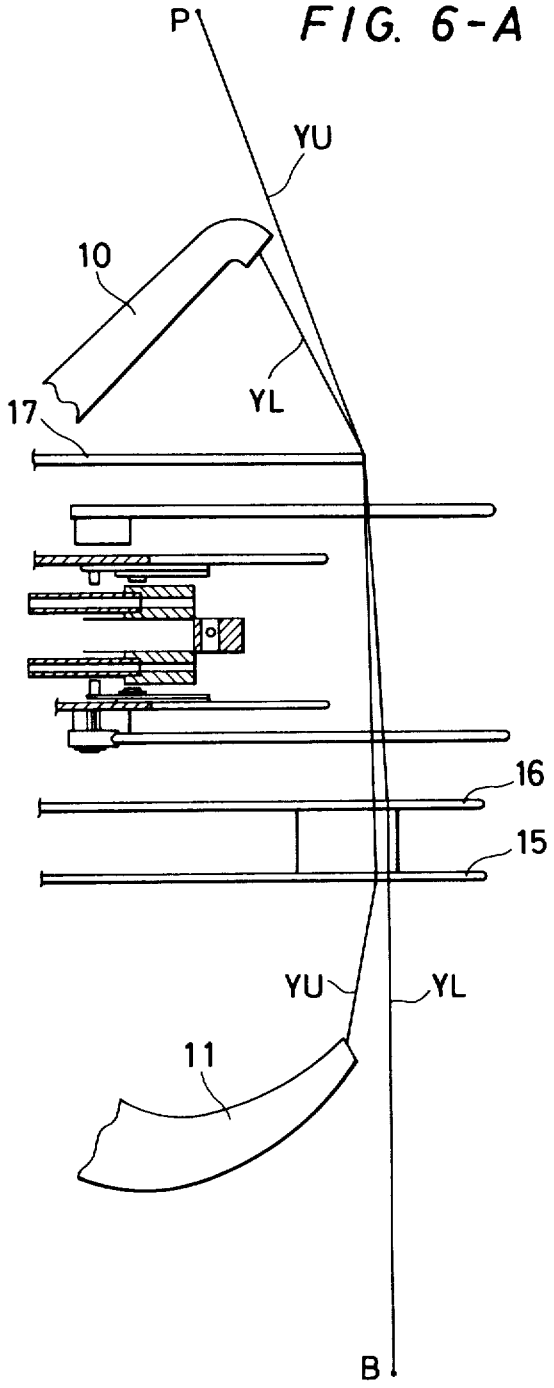

FIG. 6-B
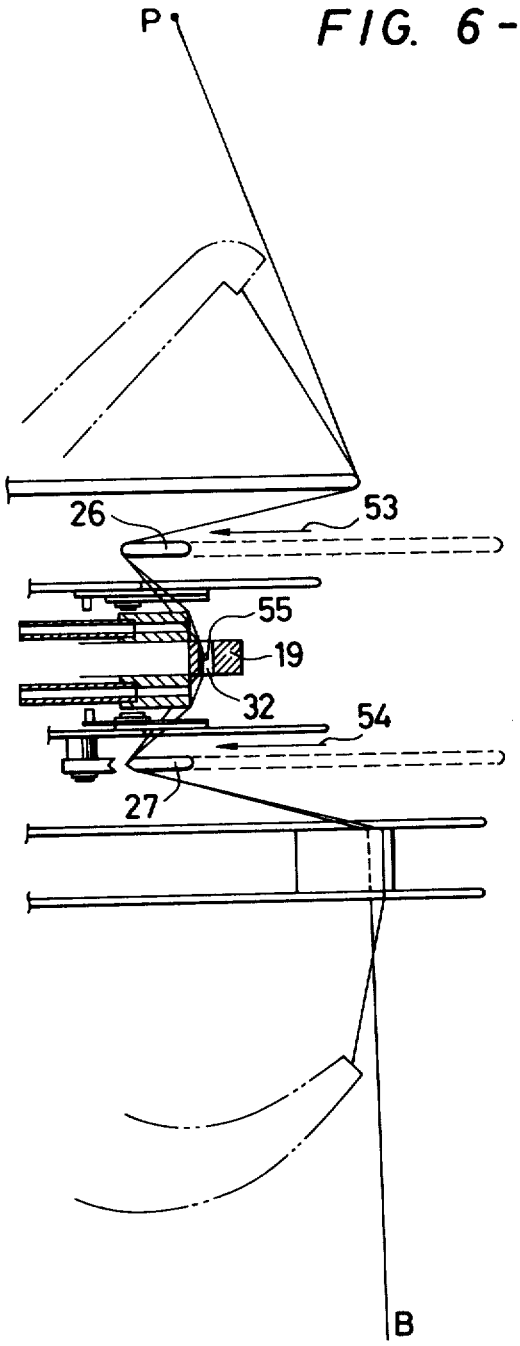

FIG. 6-C
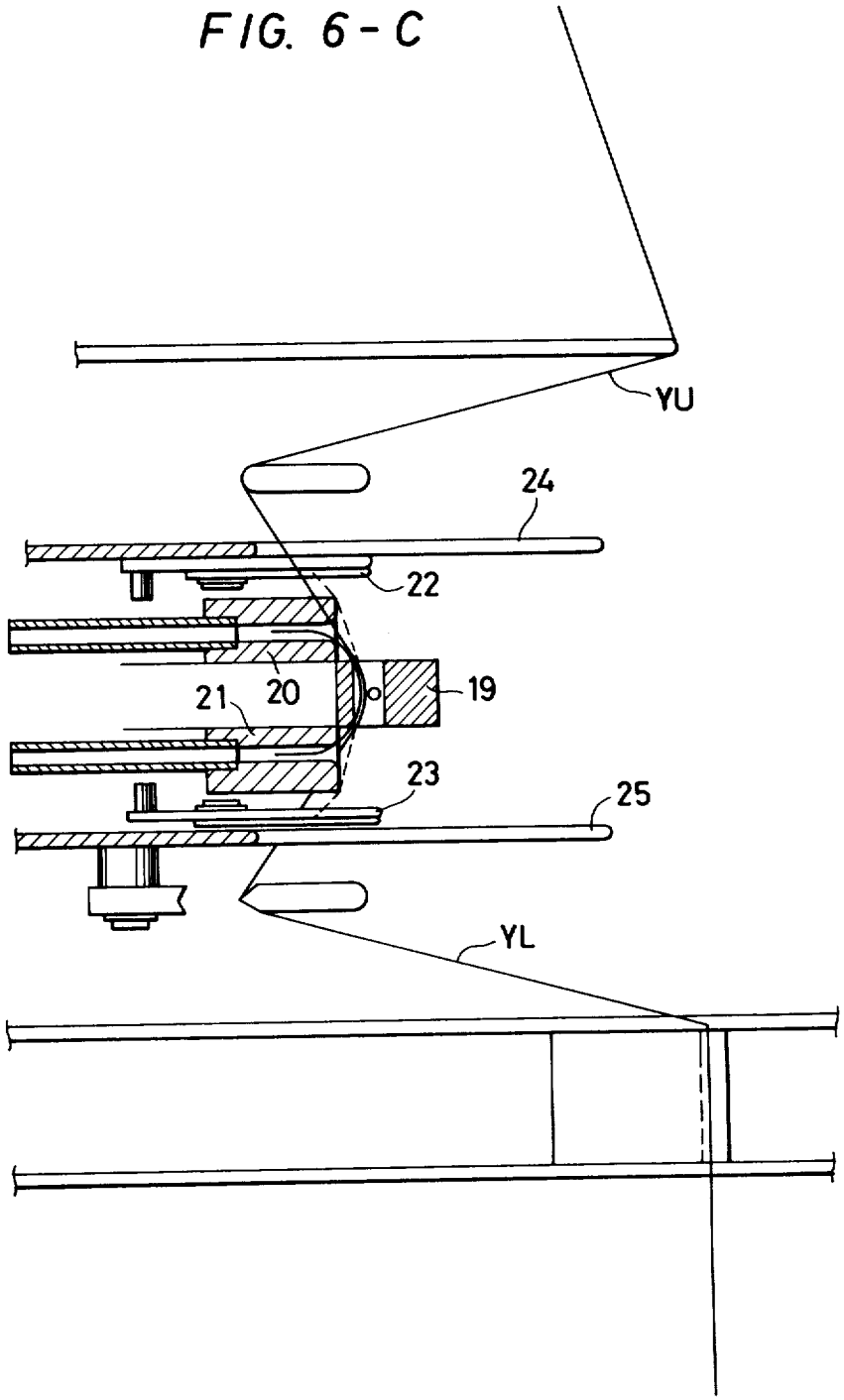

FIG. 6-D
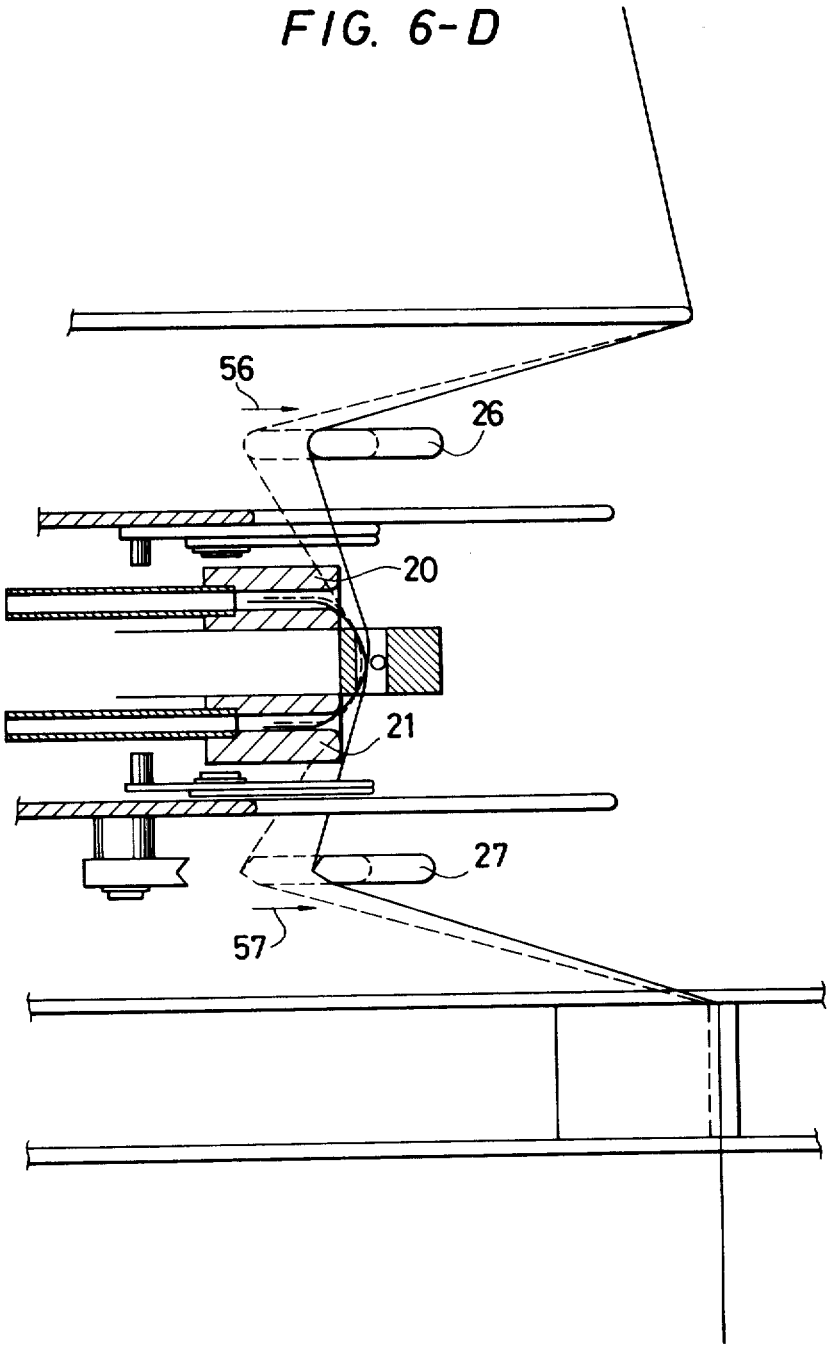

FIG. 6-E
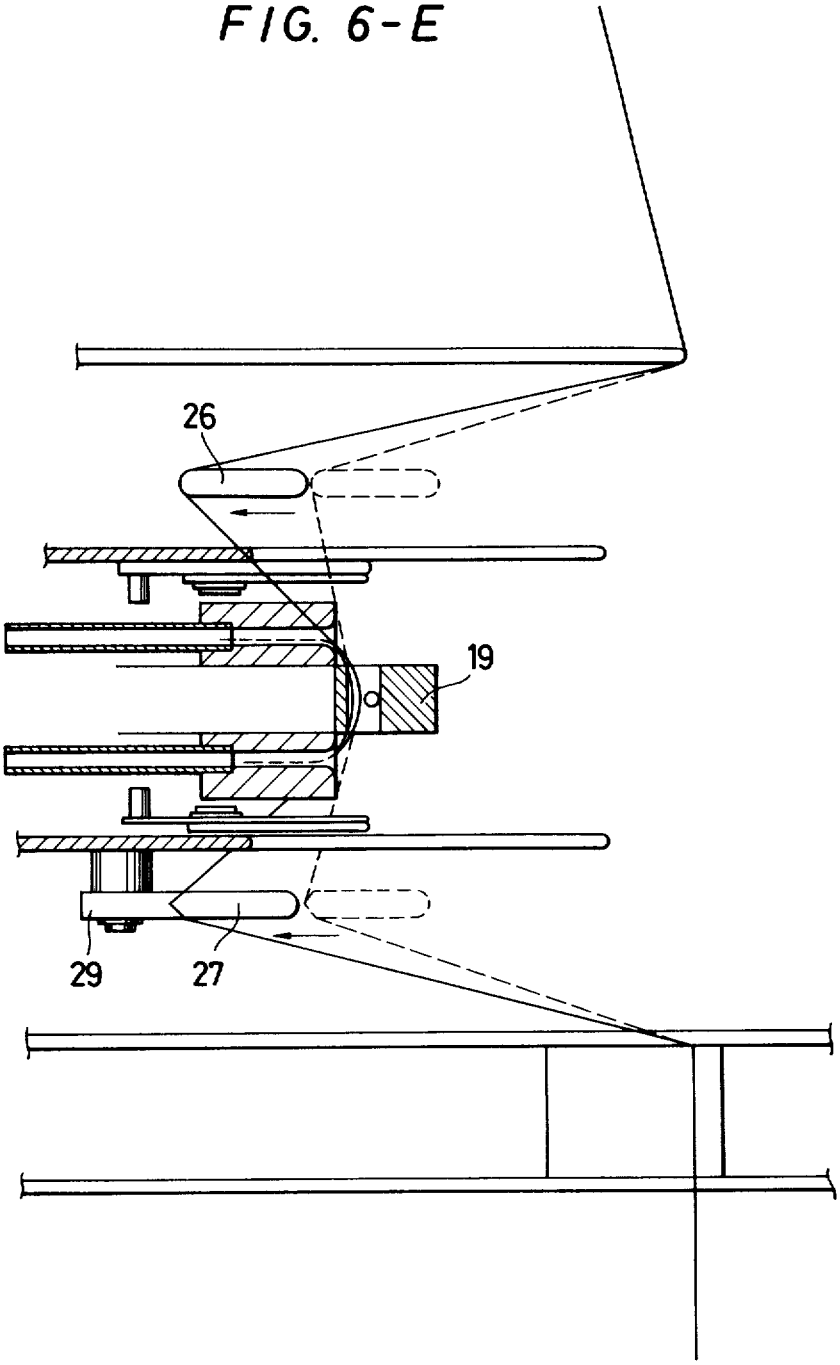

FIG. 6 - F
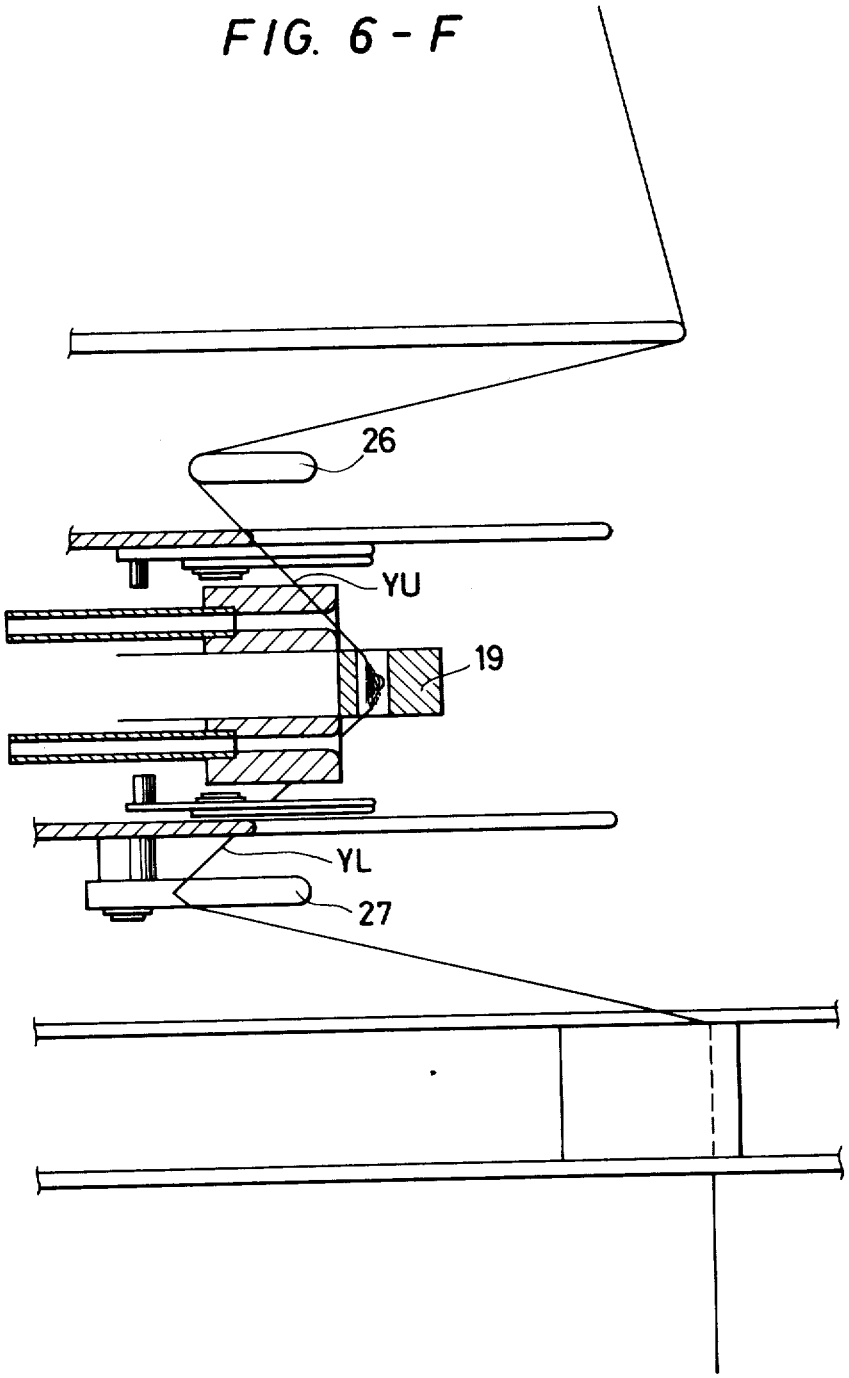

FIG. 6-G
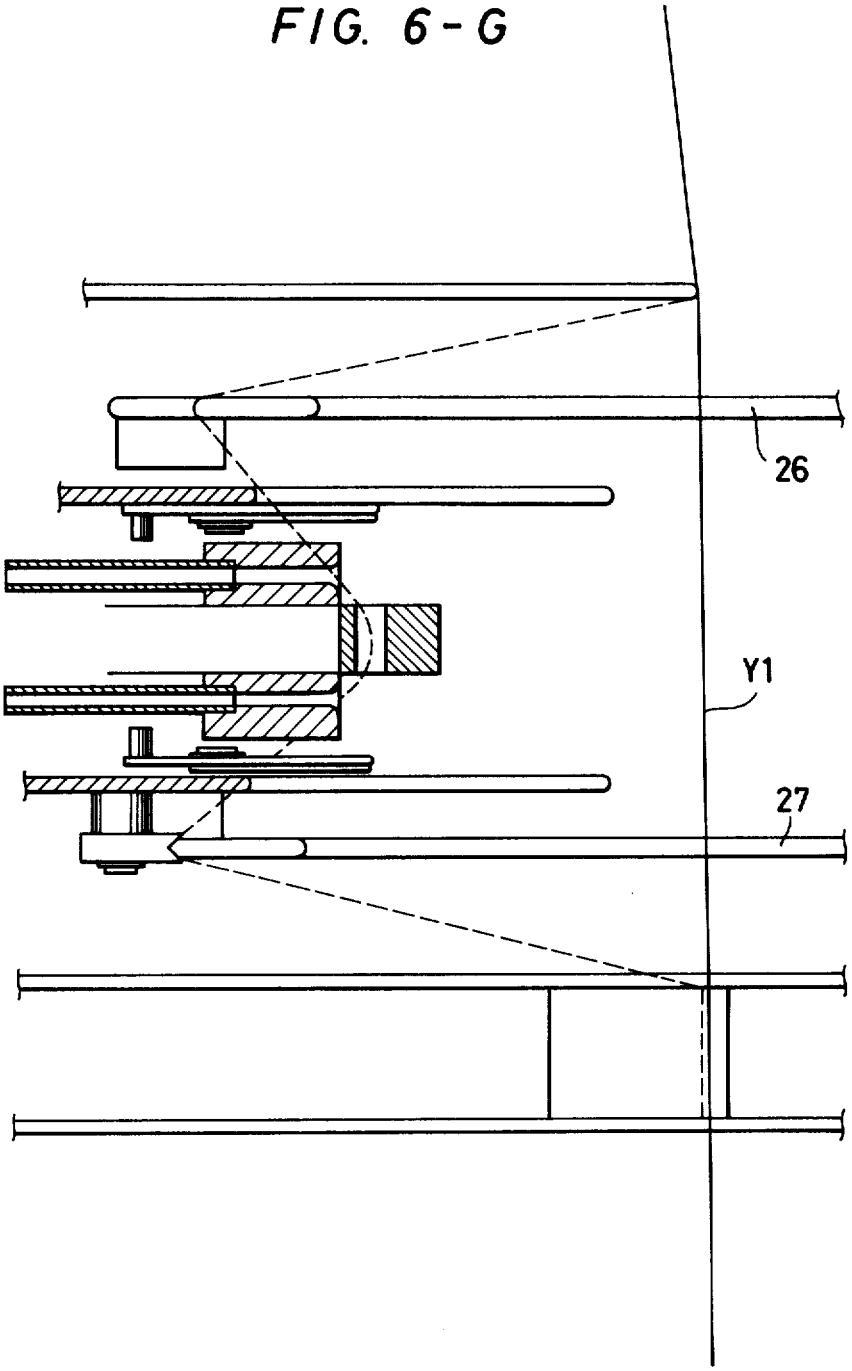

FIG. 7-A
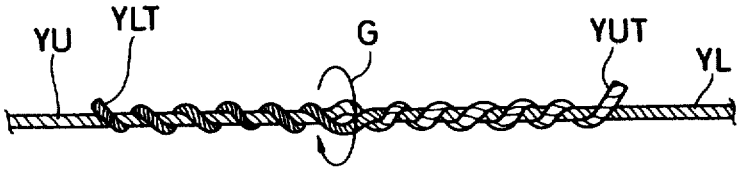
FIG. 7-B
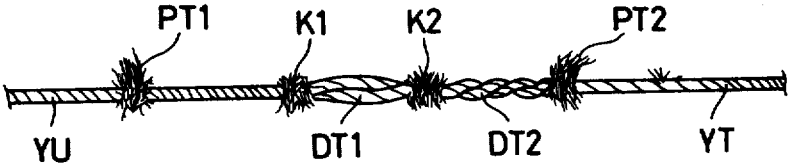
FIG. 7-C
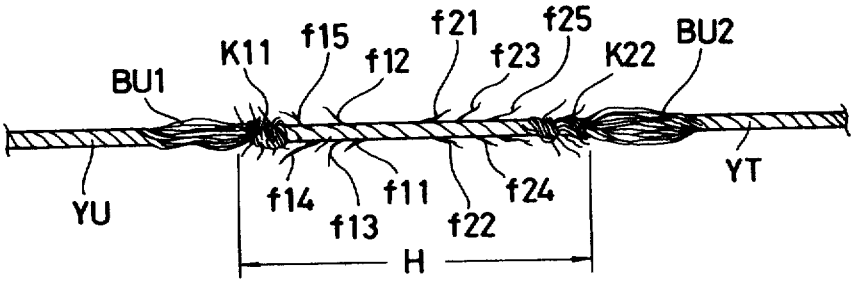

METHOD AND APPARATUS FOR SPLICING SPUN YARNS

Matter enclosed in heavy brackets [ ] appears in the original patent but forms no part of this reissue specification; matter printed in italics indicates the additions made by reissue.

FIELD OF THE INVENTION

The present invention relates to a method and apparatus for splicing spun yarns. The yarn splicing apparatus of the present invention comprises a splicing nozzle for applying a jetted air to the yarn ends, a device for introducing the yarn ends into the yarn splicing nozzle and yarn control nozzles for sucking the yarn end from the package and the yarn end from the bobbin, which are disposed at each end of the splicing nozzle.

BACKGROUND OF THE INVENTION

It has been often considered that known conventional fisherman's knots or weaver's knots are valuable as yarn splicing means suitable for mass production and it cannot be helpful that yarn defects are caused by adoption of these yarn splicing methods.

Accordingly, in case of fisherman's knots or weaver's knots, improvement of the binding strength alone has been intended so that falling of yarns is not caused even if knots are pulled, but in connection with decrease of the thickness of the knot which is about 3 times the thickness of a single yarn, only reduction of the size of the yarn end projecting from the knot has been tried. However, this large thickness of the knot results in breakage of the yarn by a knitting needle at the knitting step and continuous operation of a knitting machine is inhibited. If a knitting machine is operated continuously irrespectively of occurrence of such breakage of yarns, a knitted fabric having defective holes is produced. Furthermore, in an air of water jet room, the yarn ends projecting from knots of wefts fall in contact with opened warps and there is caused a disadvantage that the wefts fail to reach the ends of a fabric being weaven. Moreover, knots appearing on a woven fabric as a final product are regarded as defects, and in order to obtain a high quality product, a region including such knots is excluded from the fabric and in case of a medium quality or lower quality product, there should be adopted a troublesome manual operation of pushing the knots to the backside of the fabric. Accordingly, if knots are sufficiently small but can resist pulling forces applied at various processing steps, the foregoing disadvantages involved in the manufacturing process and the product quality will be eliminated.

We previously filed some patent application for means for solving the foregoing basic problem. Also in the present invention, we propose a method and apparatus for solving this problem.

According to one of our previous proposals, a yarn on the package side and a yarn on the bobbin side, which are to be spliced together, are cut and yarn ends are held by a yarn cutting and holding device and the yarn ends are subjected to an action of a splicing nozzle. In this method, however, fibers of the yarn ends on both the sides of a formed knot are not wound on the yarn but left in the angular form, and there is caused a defect that two yarns are piled together in the spliced joint and the diameter of the spliced joint becomes larger than in other regions. The main problem of the present invention is how to eliminate this defect. Of course, the utility of our previous proposal is not denied at all by the present invention, but the basic problem in the manufacturing process has already been solved by our previous proposal through a product is still insufficient in the quality (the quality grade) to some extent. More specifically, when knots of our previous proposal are adopted for two doubled or twisted yarns, the above-mentioned defect concerning the quality is not conspicuous, but in case of the knitting process using cotton or wool or the weaving process where single yarns are often used for formation of knitted or woven fabrics, knots of our previous proposal tend to result in a defect of the quality. The present invention is to eliminate this disadvantage involved in our previous proposal.

SUMMARY OF THE INVENTION

An object of the present invention is to provide a method and an apparatus for producing spun yarns having a spliced joint of which diameter is smaller than that of the conventional joints.

Another object of the present invention is to provide a method and an apparatus for producing spliced yarns having a smooth configuration and appearance which can resist various processing treatments and having a much enhanced quality without causing weave defects or knit defects.

According to the present invention, yarn end control nozzles are stationarily arranged on both the sides of a splicing nozzle and yarn ends on both the package side and bobbin side are sucked in these yarn end control nozzles while these yarn ends are kept free, whereby a sucking action is imposed on the tops of both the yarn ends to cause a certain change in the yarn ends. In this state, the yarn splicing is carried out while imparting a certain resistance to the tops of the yarn ends by an action of the splicing nozzle.

When this splicing method is adopted, angular projections of fiber ends are not formed before of after the spliced joints, and the diameter of the resulting spliced joints is smaller than the size of two piled yarns and the tensile strength of the spliced joints is 70 to 80% of the tensile strength of the single yarn. Moreover, in both the end portions of the spliced joint, fiber ends are not present in the state wound around the yarn but they are present in the state parallel to each other with entanglements being formed in such fibers arranged in parallel.

BRIEF DESCRIPTION OF THE DRAWING

FIGS. 6-A through 6-G are diagrams illustrating the operation steps in the splicing apparatus.

FIG. 7-A is a diagram illustrating the principle of splicing using an air swirling nozzle as the splicing nozzle.

FIG. 7-B is a model diagram showing a joint formed according to our previously proposed splicing method and apparatus.

FIG. 7-C is a model diagram illustrating a joint formed according to the present invention.

DETAILED DESCRIPTION OF THE INVENTION

Several terms used in the instant specification will now be illustrated. By the term "spun yarn" or "yarn" is meant a yarn including natural yarns such as cotton yarns, woollen yarns or flax yarns, and a spun yarn produced by spinning so-called staple fibers formed by cutting in the short length chemical long filaments or blend of such natural or chemical fibers. Accordingly, chemical endless long filaments are not included in the "spun yarn". Moreover, the "spun yarn" has an inherent twist number expressed in terms of twists per meter, which is given at the spinning steps, and in the present invention, it is defined that these twists are distributed substantially uniform along the entire length of the "spun yarn". Furthermore, in this "spun yarn", two or more constituent yarns may have an inherent twist number or may not have an inherent twist number.

By the term "cutting of a spun yarn" is meant mechanical cutting of the yarn in a direction rectangular to the yarn axis but is not meant separation of the yarn by a mechanical pulling action. The term "untwisting-cutting" is used to express the case where a spun yarn is untwisted by swirling streams of air to be broken and to form new yarn ends.

The present invention will now be described in detail by reference to the accompanying drawings.

Figure 1:
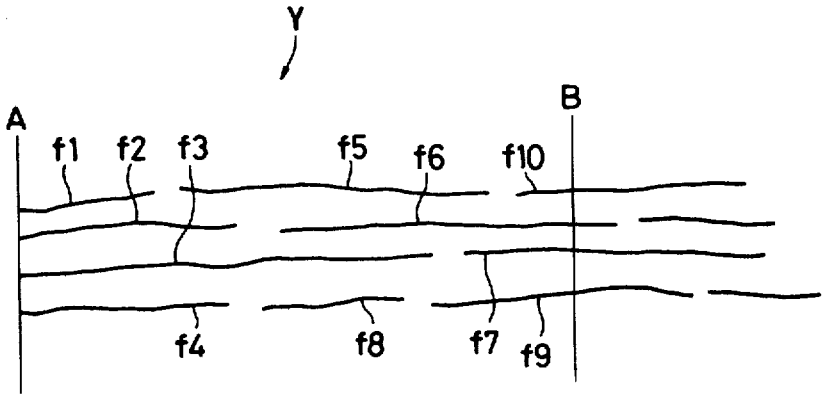
FIG. 1 is a view showing cutting of a spun yarn, in which arrangement of fibers is diagrammatically illustrated.

FIG. 1 illustrates diagrammatically arrangement of fibers in a spun yarn Y. The spun yarn Y is held at a point A and cut at a point B. Since the spun yarn Y has been twisted and it has a property that fall-out of individual fibers is prevented by such twists, separation of fibers f1 to f10 is hardly caused. Furthermore, even when the spun yarn Y is held at the points A and B and it is false-twisted by jetting air between the points A and B, separation of the fibers f1 to f10 is hardly caused. In this case, it can be presumed that some fiber f8 may be separated, but it is considered that reduction of the fiber quantity between the points A and B is substantially zero.

When the yarn is held only at the point A but kept free at the point B and the yarn is false-twisted between the points A and B by an air stream, the possibility of separation or flying of the fibers f10, f7, f9, f8 and f6 is remarkably increased. In this case, if the false-twisting direction is reverse to the direction of inherent twists of the spun yarn, better results will be obtained. Namely, the quantity of fibers left on the side of the point A is drastically reduced. In this case, the false-twisting time (quantity and intensity), characteristics of fibers and the position B where the spun yarn is cut must be taken into account as factors causing variations. The false-twisting time, which is closely related to the time of initiation of entanglements in the spun yarn, will be described in detail hereinafter. Influences of the characteristics of fibers and the position where the spun yarn is cut are now described. For example, cotton fibers are in the form of a twisted hollow string, and the fiber length is 10 to 40 mm through the fiber length varies to some extent according to the place of production, and wool fibers are in the form of a string covered with scales and it is said that the fiber length of wool fibers is 20 to 200 mm though the fiber length varies to some extent according to the kind of sheep and the collection position. The above-mentioned position B is set according to such characteristics of fibers, though setting of the position B is not simply defined because blending of various fibers if often performed. However, if the distance between the points A and B is not the same as or shorter than the average length of fibers constituting the spun yarn to be processed, the significance of the cutting position B will be lost. If the above distance is much shorter than the average length, the risk of separation of fibers is remarkably reduced. Of course, in case of untwisting cutting different from the mere cutting, the position B may be set so that the distance between the points A and B is larger than the average fiber length.

It will readily be understood that according to the spun yarn cutting and holding method we previously proposed, it is relatively difficult to control and reduce the size of the spliced joints. Furthermore, it will readily be understood that if the spun yarn is subjected to an action of a suction stream while keeping the fiber ends free according to the present invention, the first function of separating and removing fibers by the yarn control nozzles can be sufficiently exerted.

The spun yarn Y consisting of fibers f1, f2, f3 and f4, which is held at the nip point A is piled on a spun yarn kept in a similar state and is exposed to an action of the splicing nozzle to effect splicing by entanglements among fibers of the yarns. If the fibers are not restrained and are subjected to an action of air jetted from the splicing nozzle for a certain time, random entanglements are caused among the fibers and in many cases, yarn splicing is not accomplished successfully. In other words, the yarn end of the spun yarn is raised by the air stream and fibers of the yarn ends of both the spun yarns are entangled with each other at some stage of rising. Then, both the yarn ends are integrated and start a movement agreeing with the movement of the air stream, and a fiber movement is caused by strong entanglements among the fibers. Accordingly, a variation is caused in the time required for causing initial entanglements among fibers of both the yarn ends, which have been raised by the air stream. Namely, even if air is jetted from the splicing nozzle for a certain time, no constant certain air jetting is attained. In order to eliminate this variation, it is necessary in principle to restrain both the yarn ends, and it is preferred that the overlap quantity of both the yarn ends exceeds a certain level. However, as pointed out hereinbefore, the overlap quantity of both the yarn ends varies according to the cutting position of the spun yarn. Namely, in FIG. 1, it cannot be said that all fibers f10, f7, f9 and f8 can always be removed and detached. In some case, only the fiber f10 may be detached and removed but other fibers f1 to f9 are nipped at the point A. In other case, only the fibers f10 and f7 may be detached and removed. However, based on experimental data, it is possible to set the spun yarn cutting position so that the fibers f10, f7, f8 and f9 can be detached and removed on the average from the spun yarn. Furthermore, it is possible to find out data of the degree of entanglements among fibers constituting the spun yarn. Moreover, the overlap quantity can be determined according to the pressure and quantity of air jetted from the splicing nozzle. Namely, the overlap quantity can be determined depending on data of the state of jetting of air from the nozzle, for example, strong jetting in the initial stage and subsequent weak jetting. Thus, the overlap quantity is determined according to various conditions. However determined the overlap quantity may be, the yarn splicing will not be successful if the top ends of fibers are not restrained. This does not mean that the overlap quantity is of no significance. If the top ends of fibers are restrained, the overlap quantity will be a significant factor for obtaining good spliced joints. As pointed out hereinbefore, fibers are first raised by the splicing nozzle, and after first entanglements among top ends of the fibers, joints are formed by the movement of the fibers agreeing with the movement of the air stream from the nozzle. If both the yarn ends piled and inserted in the splicing nozzle are not restrained at all and they are subjected in this state to the action of the jetted air stream, the yarn ends are freely raised up and their behaviors are not constant, and therefore, yarn splicing can not be accomplished at all even if both the yarn ends are doubled, because both the yarn ends fly and escape from the splicing nozzle. However, if the abovementioned yarn end control nozzles are disposed to subject the yarn ends to the action of these control nozzles at the splicing step, a resistance corresponding to the suction force of the yarn end control nozzle is imposed on the top ends of fibers. Accordingly, entanglements of the top ends of fibers are caused convergently at a certain point of time under the action of the splicing nozzle. After first entanglement of both the yarn ends, the splicing nozzle entangles the top ends of the fibers with fibers of another spun yarn against the suction force of the yarn end control nozzles. In other words, the second function of the yarn end control nozzles in the present invention is a function of causing first entanglement at a certain point of time and pulling the top ends of fibers while imparting a certain resistance thereto. In the actual operation, the pressure of the yarn end control nozzles may be appropriately selected depending on the abovementioned characteristics of fibers. If this second function is not exerted by the yarn end control nozzles, the first entanglement becomes indefinite and the size of the spliced joint tends to become small. If joints are formed without any resistance given to the yarn ends, variations are caused in the intensity of the entanglement among fibers, and as a result, variations of the tensile strength in the joints in the spliced yarn as a whole are caused.

In connection with this second function, if such yarn end control nozzles are used, the step of assisting formation of a balloon by forming a certain slacking in the doubled spun yarns as in our previously proposed method using a swirling nozzle as the splicing nozzle and the above-mentioned cutting and holding device need not be performed. More specifically, when the splicing nozzle is operated, the yarn end in an amount necessary for formation of a balloon is taken out from the yarn end control nozzle and the suction force of the yarn end control nozzle allows ballooning while controlling the degree of ballooning. If this function is called a buffer function, as the third function of the yarn end control nozzles, there can be mentioned this buffer function.

The present invention will now be described in detail by reference to embodiments illustrated in the accompanying drawings.

Figure 2:
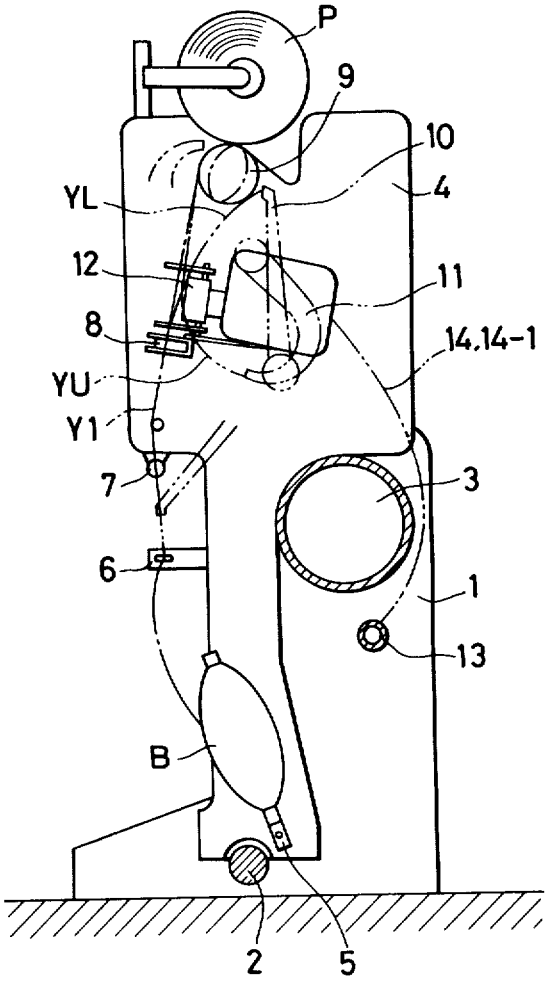
FIG. 2 is a diagram illustrating the side view of an automatic winder provided with a splicing apparatus.

In FIG. 2, an automatic winder to which the present invention is applied is diagrammatically outlined. The present invention can be applied to any of known automatic winders and the applicable automatic winder is not limited to one illustrated in FIG. 2.

A shaft or pipe 2 and a pipe 3 are laid out between side frames 1, and a winding unit 4 is turnably supported on the shaft 2. While the winder is operated, the winding unit 4 is also placed on the pipe 3 and is appropriately fixed. The pipe 3 is connected to a blower (not shown) and a suction stream is always applied to the pipe 3.

Rewinding of the yarn from a bobbin B to a package P in this winding unit is accomplished in the following manner.

A yarn Y1 from the bobbin B on a peg is guided to a tensioner 7 through a guide 6 and a certain tension is applied to the yarn Y1. Then, the yarn is passed through a detecting device for detecting and cutting the yarn unevenness and also detecting travelling of the yarn and is wound on the package P rotated by a winding drum 9. When the yarn unevenness is detected, a cutter of the detecting device is actuated, and the running yarn Y1 is cut to stop the winding operation. Simultaneously, a first yarn guide suction arm 10 is actuated to insert a yarn YL on the bobbin side into a yarn splicing device 12 located apart from an ordinary yarn running passage Y1 and a second yarn guide suction arm 11 is actuated to insert a yarn YU on the package side into the splicing device 12. After splicing has been performed in the splicing device, rewinding of the yarn is conducted again. The first and second yarn guide suction arms 10 and 11 are connected to the pipe 3 to which the suction stream is applied.

Figure 3:
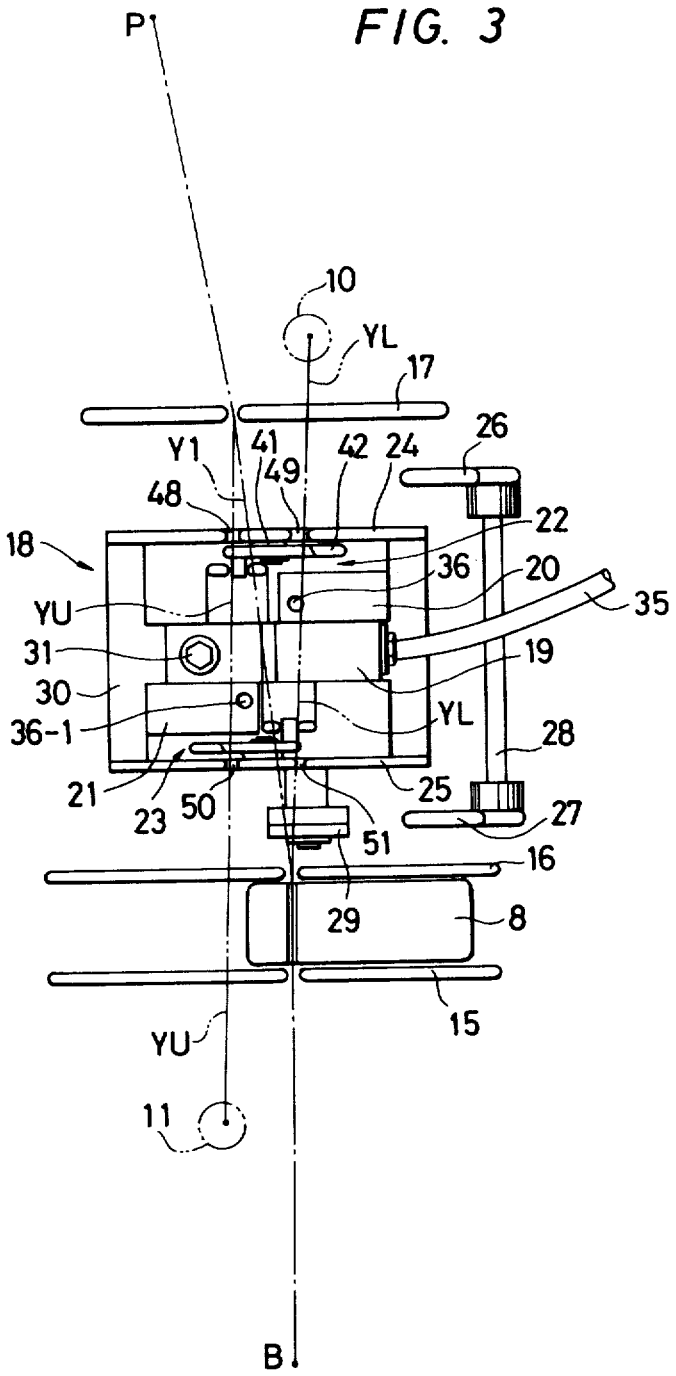
FIG. 3 is a front view showing the main part of the splicing apparatus.
Figure 4:
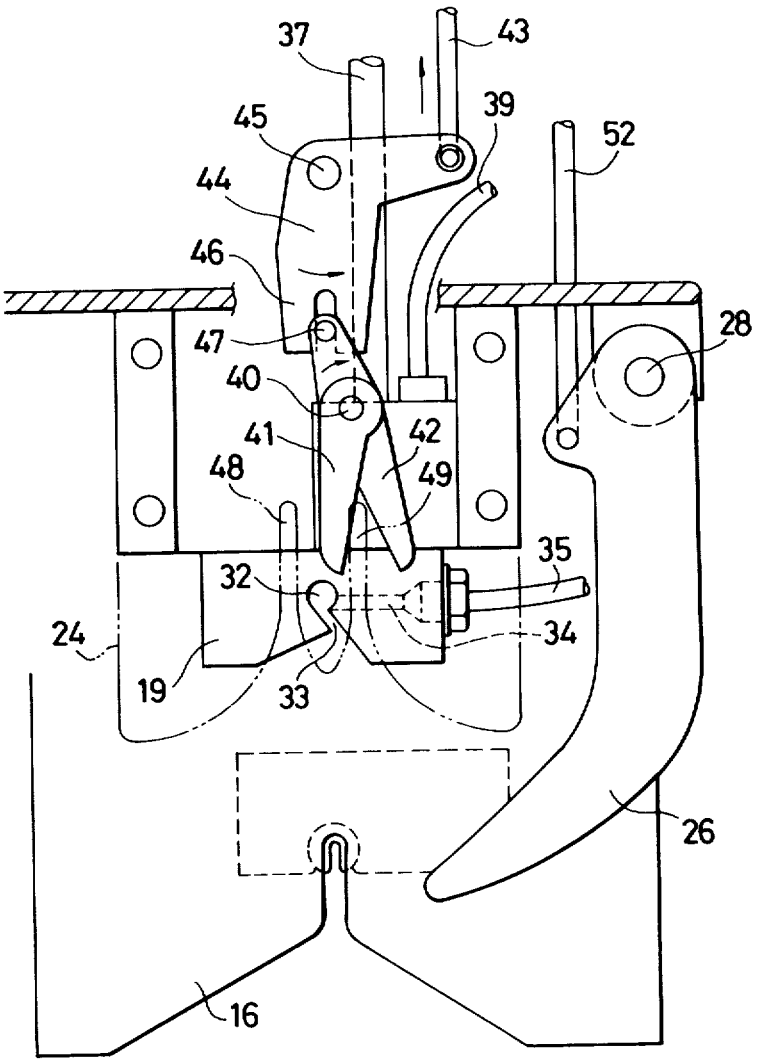
FIG. 4 is a plan view of the splicing apparatus.

The splicing device 12 is illustrated in detail in FIGS. 3 and 4. Since compressed air is used in this splicing device, a pipe 13 is laid out as shown in FIG. 2 and communicated through conduits 14 and 14-1.

Referring to FIG. 3, during the ordinary rewinding operation, the yarn travels through the detecting device 8 and guide plates 15 and 16 disposed before and after the detecting device 8 from the bobbin B and along a yarn passage from an upper guide plate 17 to the package P. This passage is an ordinary yarn passage. There may be adopted a modification in which a yarn inspecting device is mounted on the guide plate 17 to detect the diameter of the joint for automatically cutting and removing a joint having an unfavorable diameter and to give yarn splicing instructions. The yarn splicing device is interposed between the guide plates 16 and 17 and the first and second yarn guide suction arms 10 and 11 are arranged so that they are moved to the outside of the guide plates 15 and 17 and stopped outside the guide plates 15 and 17. The guided yarn ends are represented by YU and YL in FIG. 3.

In the body 18 of the splicing device, there are integrally disposed a splicing nozzle 19, two yarn end control nozzles 20 and 21, two cutting devices 22 and 23 and upper and lower guide plates 24 and 25.

Yarn guide levers 26 and 27 are disposed so that they can turn with a shaft 28 being as the center. The positions of the yarn guide levers 26 and 27 which have turned are between the guide plates 17 and 24 and between the guide plates 25 and 16, respectively. A member 29 having a V-shaped section disposed in the lower portion of the body of the splicing device co-operates with the lever 27 to clamp the yarn YL. If another clamping member 29 is disposed between the guide plates 17 and 24 and the splicing operation is carried out while clamping both the yarn ends, the length of the yarn ends can be kept constant and the yarn splicing operation can be performed under a good control. Accordingly, the number of clamping members is not limited to one as in the embodiment shown in the drawings.

Functions and structures of the respective members will now be described in more detail.

The yarn splicing nozzle 19 is fixed to a bracket 30 by means of a bolt 31, and as clearly shown in FIG. 4, a cylindrical hole 32 is formed through a square column and a slit 33 suitable for inserting the yarn from the outside is formed along the entire length of the hole 32 in the axial direction thereof. A jetting hole 34 is opened tangentially to said hole 32. A conduit 35 is connected to the jetting hole 34 and it is connected to the pipe 13 through the conduit 14 via a change-over valve. In the present embodiment, one jetting hole 34 is formed for the hole 32, but a plurality of jetting holes may be formed for the hole 32. As will be apparent from the intended object of the present invention, the splicing nozzle 19 is not limited to the swirling type shown in the drawings. For example, there may be used a nozzle in which a V-shaped groove is formed on a square column and an air jetting hole is formed on the bottom of the groove to disturb two yarns, and a nozzle in which an opening and closing lid is formed to cover the top face of the above-mentioned V-shaped groove. Furthermore, other types of air jetting nozzles may be used.

Figure 5:
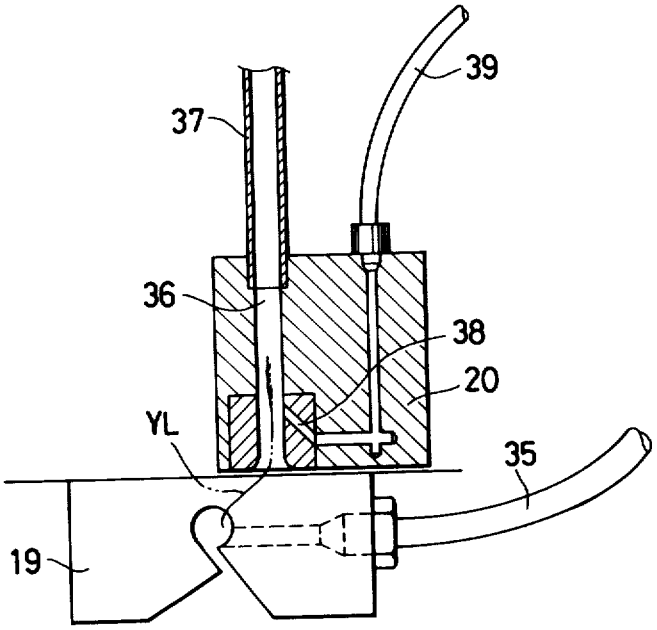
FIG. 5 is a sectional view illustrating the suction nozzle portion in the splicing apparatus.

The yarn end control nozzle 20 is illustrated in detail in FIG. 5. The yarn end control nozzle 21 has a similar structure and therefore, explanation of the nozzle 21 is omitted. A nozzle hole 36 is connected to the pipe 3 through a flexible pipe 37 and a suction force is always applied to the nozzle hole 36. There may be adopted a modification in which the nozzle hole 36 is connected to the pipe 3 through a valve so that the suction force is applied only when application of the suction force is necessary. A jetting hole 38 is opened on the nozzle hole 36 and is inclined in the direction along which the suction force acts. The jetting hole 38 is connected to the compressed air pipe 13 through a flexible pipe 39, a valve and the above-mentioned conduit 14-1. There may be adopted a modification in which the jetting hole 38 is opened in the tangential direction so as to generate swirling air streams and the swirling air streams are imposed on the yarn YL in the direction reverse to the twisting direction in the yarn YL. This yarn end control nozzle is fixed while it is used, but it is preferred that the position of this nozzle can be freely adjusted.

The cutting device 22 will now be described by reference to FIG. 4. Since the mechanism and structure of the cutting device 23 are the same as those of the cutting device 22, explanation of the cutting device 23 is omitted.

The cutting device 22 has a scissor-like shape. A movable blade 42 turns relatively to a fixed blade 41 with a pin 40 being as the center to cut the yarn YL. One yarn is sucked and removed by the first yarn guide suction arm 10 and the other yarn is sucked and held by the yarn end control nozzle 20. As the mechanism for the movable blade 42, a rod 43 is drawn by a control cam (not shown) to turn a two-forked lever 44 in the counterclockwise direction with a shaft 45 being as the center, and the fork portion 46 of the lever 44 moves a pin 47 of the movable blade 42 to turn the movable blade 42 in the clockwise direction to cut the yarn.

The guide plates 24 and 25 are arranged outside the cutting devices 22 and 23, and the guide plates 24 and 25 have guide grooves 48 and 49 and guide grooves 50 and 51, respectively. The yarn YL is inserted in the guide grooves 49 and 51 and the yarn YU is inserted in the guide grooves 48 and 50. At this point, the yarn YL is located in the cutting device 22 on the nozzle hole 36 and the yarn YU is located in the cutting device 23 on the nozzle hole 36-1.

The yarn guide levers 26 and 27 are fixed together to the shaft 28. When a rod 52 is drawn by the action of a control cam (not shown), the yarn guide lever 26 turns in the clockwise direction in FIG. 4 with the shaft 28 being as the center, and the yarns YU and YL are inserted in the guide grooves 48 and 49 and the guide grooves 50 and 51, respectively, according to the configuration of the guide plates 24 and 25.

The operation of the entire apparatus will now be described.

When the yarn travel detecting device 8 detects the absence of the running yarn, that is, yarn breakage or consumption of the yarn on the bobbin, during the rewinding operation, the drum 9 is stopped and simultaneously, a one-way rotation clutch is actuated to cause control cams formed on a shaft rotated by said clutch or control cams co-operating with said shaft to perform the yarn splicing operation. At first, the first and second yarn guide suction arms are shifted from the positions indicated in FIG. 2 to pick up the yarns YL and YU on the bobbin and package sides and deliver them to the yarn splicing device 12.

This state is illustrated in FIG. 6-A. The yarn YL from the bobbin B is passed through guide grooves of the lower guide plates 15 and 16 and is placed on the upper guide plate 17, and the yarn YU on the package side is passed through the guide groove of the guide plate 17 and is placed above the guide plates 15 and 16.

Then, the yarn guide levers 25 and 26 are turned by contraction of the rod 52 by other control cams, and the yarns YU and YL are simultaneously pushed in the directions indicated by arrows 53 and 54. At this point, according to configurations of the guide plates 24 and 25, the yarn YL on the bobbin side is inserted into the guide grooves 49 and 51 and the yarn YU on the package side is inserted into the guide grooves 48 and 50. In this state, there is established an arrangement suitable for cutting of the yarns YL and YU and suction by the yarn end control nozzles. Referring to FIG. 6-B showing the section of the splicing nozzle 19, the yarns YU and YL are inserted through the slit 33 in the hole 32 where the opening 55 of the air jetting hole 34 is formed.

Subsequently, the cutting device 22 is actuated to cut the yarns YL and YU and the cut ends are sucked by the yarn end control nozzles 20 and 21, as shown in FIG. 6-C.

Referring to FIG. 6-D, the yarn guide levers 26 and 27 are slightly returned to the directions indicated by arrow 56 and 57. During this return movement or after this return movement, compressed air is jetted from the air jetting holes of the yarn end control nozzles 20, 21 by the action of control cams (not shown). At this step, the yarn ends are sufficiently intruded in the yarn end control nozzles and fibers are scattered away by the jetted air streams. Of course, untwisting-cutting of the spun yarn may be caused by generating swirling streams in the jetted air streams and turning the yarn in a direction reverse to the inherent twisting direction of the yarn. As a result of experiments made by using the same apparatus, it was confirmed that although untwisting-cutting is relatively difficult in case of wool, sufficient untwisting-cutting can be accomplished in case of cotton. When a sufficient action is applied to the yarn ends by the yarn end control nozzles 20 and 21 and fibers are sufficiently detached, the step shown in FIG. 6-D may be omitted. After completion of this step, jetting of air is stopped. The reason is that in the present embodiment, since the capacity of the pipe 37 is small, if the quantity of the jetted air stream becomes excessive, there is caused a risk of fly-out of the yarn ends from the nozzles by an adverse current of air. If the capacity of the pipe 37 is sufficiently large, jetting of air may be continued according to need.

At the step shown in FIG. 6-E, the levers 26 and 27 are forwarded to the most advanced positions, and the yarn is clamped between the lever 27 and the member 29. By this movement, the yarn end once inserted into the yarn end control nozzle is pulled out again. Since the swirling nozzle is used as the splicing nozzle 19 in the present embodiment, twists of the yarn is transferred to such a side that the swirling direction of the swirling nozzle is reverse to the inherent twisting direction of the yarn, when the yarn ends are entangled with each other. In short, in order to prevent displacement of the jetting point for imparting twists with the twisting operation, the member 29 is disposed on the side that the swirling direction of nozzle in reverse to the twist of the yarn. When the splicing nozzle 19 is one for causing disturbance alone, this member 29 need not be disposed.

At the subsequent step shown in FIG. 6-F, the valve is operated by means of control cams (not shown) to actuate the splicing nozzle 19 to form a spliced joint between the yarns YU and YL. At this step of forming of the spliced joint, the top yarn ends are drawn out from the yarn end control nozzle holes 36 and 36-1 and they are entangled with each other.

Then, the levers 26 and 27 are returned, and the spliced yarn is shifted to the ordinary yarn passage by the winding tension imposed on the yarn as shown in FIG. 6-G.

Spliced joints formed by using the method and apparatus according to the above-mentioned embodiment of the present invention are shown in FIG. 7-C. In this case, a wool single yarn Nm 40 is processed under a splicing nozzle pressure of 5.5 kg/cm$^2$ and a yarn end control nozzle pressure of 4 kg/cm$^2$. Furthermore, when a cotton single yarn Ne 40 is processed under a splicing nozzle pressure of 6 kg/cm$^2$ and a yarn end control nozzle pressure of 6 kg/cm$^2$, joints similar to those shown in FIG. 7-C are obtained. The reason why a higher yarn end control nozzle pressure is adopted in case of cotton than in case of wool is that sufficient untwisting-cutting is caused by increasing the pressure.

In order to clearly explain the characteristics of joints formed by using the above-mentioned method and apparatus of the present invention, FIGS. 7-A and 7-B are given together with FIG. 7-C. Joints shown in FIGS. 7-A and 7-B are those formed by using swirling nozzles, and if these joints are compared with those shown in FIG. 7-C, excellent effects of the present invention will readily be understood. Joints shown in FIGS. 7-B and 7-C are formed by using various common elements and factors, and it must be noted that various different joints are formed by changing conditions such as the air pressure, air quantity, inner diameter, size, jetting hole diameter and jetting frequency in the splicing nozzle or the yarn end control nozzle.

In the case shown in FIG. 7-A, the yarn YU on the package side is doubled with the yarn YL on the bobbin side and the doubled yarns are turned in a direction indicated by an arrow at the action point G of the splicing nozzle, the yarn ends YLT and YUT are entangled and wound around the yarns YU and YL. If the twisting direction of the yarns YU and YL and the swirling direction of the air stream from the nozzle are appropriately set, a twist number larger than the inherent twist number is given to the yarn YU, and it is construed that the quantity of twists thus additionally given in substantially equal to the quantity of untwisting in the yarn YL. The reason is that twists given by the splicing nozzle are false twists and if the action of the splicing nozzle is stopped, the thus given twists are theoretically reduced to zero (of course, it depends on when the yarn ends YLT and YUT are entangled around the yarns YU and YL to impart false twists as a whole). Accordingly, by the action of the splicing nozzle, twists on the yarn YL are shifted and accumulated on the yarn YU, and it is construed that if the operation of the splicing nozzle is stopped, by the tension imposed at the start of the winding operation by the automatic winder, the twists accumulated on the yarn YU are returned to the yarn YL. During this period, changes are caused in the fibers of the top yarn ends YLT and YUT, and it is presumed that thus detached fibers are entangled with the yarns YU and YL to form a spliced joint. If there is used a nozzle not generating a swirling stream but producing a turbulent flow of air, gathering of fibers in the yarn ends YLT and YUT is disturbed and a random state is brought about in the fibers.

The above-mentioned presumptive principle shown in FIG. 7-A is applied to the cases of FIGS. 7-B and 7-C. In the case of FIG. 7-B, the yarn ends YLT and YUT in the cut and held state are subjected to the action of a swirling nozzle, and top ends of the fibers held on both the ends of the joint are cut into substantially the same length to leave angular projections PT1 and PT2 and separated fibers are entangled between the projections PT1 and PT2 to form entanglements K1 and K2 in the resulting joint (see fibers f5 and f8 in FIG. 1). Furthermore, since the yarn ends YLT and YUT are cut and held, even if the yarns are subjected to the action of the swirling nozzle, the possibility of producing a new fiber arrangement by releasing inherent twists of the yarns is very small, and therefore, it is construed that two-yarn doubled portions DT1 and DT2 are formed. From the foregoing, it is inevitably considered that fibers detached between the projections PT1 and PT2 correspond to entanglements K1 and K2, decrease of the fiber quantity in the joint portion between the projections PT1 and PT2 is substantially zero and the joint portion has a diameter corresponding to the sum of the diameters of the two yarns. This joint illustrated in FIG. 7-B is one formed according to our previously proposed splicing method and apparatus.

In the case shown in FIG. 7-C, since detached fibers are removed by the action of the above-mentioned yarn end control nozzle, the quantity of fibers in the portion H is reduced and is smaller than the quantity corresponding to the sum of diameters of two doubled yarns. In the integrated portion H, loose twists in the same twisting direction as in the yarn YU or YT are observed, but in some case, the portion H is separated into two yarns and they are entangled with each other. On both the outsides of the portion H, there are present swollen portions BU1 and BU2 where fibers are arranged in parallel to one another, and in entanglements K11 and K12, fibers are wound in the direction rectangular to the yarn axis. The fiber end considered to correspond to the top yarn end YLT is inclined to the left in FIG. 7-C and is broken here and there as indicated by f11, . . . and f15. Furthermore, the portion considered to correspond to the top yarn end YUT is inclined to the right in FIG. 7-C and broken here and there as indicated by f21, . . . f25. If this arrangement of the top ends of fibers are compared with the arrangement of projections PT1 and PT2 shown in FIG. 7-B, where the top ends of fibers are aligned substantially in parallel, it will readily be understood that the joint formed according to the present invention has a smooth configuration and appearance.

As will be apparent from the foregoing illustration, according to the present invention, there can be provided spliced joints which can resist various processing treatments and have a much enhanced quality without causing weave defects or knit defects.

What is claimed is:

1. A method for splicing spun yarns in an automatic winder by inserting yarn ends into a yarn splicing nozzle and being subjected to an air jet to splice them in the yarn splicing nozzle, characterized in that splicing is performed by subjecting a yarn on the package side and a yarn on the bobbin side to an action of air stream jetted from the splicing nozzle, while both the yarn ends on the package and bobbin sides are kept free under an action of suction stream in independent yarn control nozzles for the yarn end on the package side and the yarn end on the bobbin side, respectively.

2. A method for splicing spun yarns as set forth in claim 1, wherein the yarns are cut on the bobbin side and on the package side and the yarn splicing is performed after cutting the yarns on the bobbin side and on the package side and scattering away fibers of the cut yarn ends by means of jetted air stream in the each yarn end control nozzle.

3. A method for splicing spun yarns as set forth in claim 2, wherein an untwisting-cutting process in which the yarn is untwisted by the jetted air to cause yarn breakage is subjected to the yarn ends as a substitute for the process of cutting of the yarn ends and scattering away of fibers at the cut yarn ends.

4. A method for splicing spun yarns as set forth in claim 1, wherein the yarn ends on the package side and the yarn on the bobbin side are clamped by a clamping member before the yarns on the package side and on the bobbin side are subjected to the action of air streams jetted from said splicing nozzle, and this clamping is released after the yarns on the package side and on the bobbin side are subjected to the action of air streams jetted from said splicing nozzle.

5. An apparatus for splicing spun yarns in an automatic winder comprising a splicing nozzle disposed at a position apart from an ordinary yarn passage of the automatic winder, two movable yarn guide suction arms mounted to guide a yarn connected to a package and a yarn connected to a bobbin to said splicing nozzle, respectively, yarn end control nozzles disposed on both the sides of said splicing nozzle to insert both the yarn ends on the package side and on the bobbin side into the splicing nozzle when both the yarn ends are guided by said movable arms, yarn guide levers mounted in the vicinity of openings of said yarn end control nozzles and cutting means for cutting the yarns on both the package and bobbin sides between said yarn guide levers and said movable arms when said yarn guide levers are operated, wherein the yarn ends cut by said cutting means are sucked by the corresponding yarn end control nozzles, respectively and are exposed to an action of suction streams while the yarn ends are kept free and the yarn end of the package side and the yarn end on the bobbin side are spliced together under the action of said splicing nozzles.

6. An apparatus for splicing spun yarns as set forth in claim 5, wherein the yarn end control nozzle comprises a nozzle hole where a suction force is applied to, and a jetting hole which is opened on the nozzle hole and is inclined in the direction along which the suction force acts.

7. An apparatus for splicing spun yarns as set forth in claim 5, wherein a clamping member for guiding yarn is disposed at least on one side of the splicing nozzle to co-operate with the yarn guide lever.

8. A method for splicing spun yarns in an automatic winder by inserting yarn ends into a yarn splicing nozzle and being subjected to an air jet to splice them in the yarn splicing nozzle, characterized in that splicing is performed by a combination of steps comprising guiding yarn ends by yarn guide suction arms, inserting the yarn ends into the yarn splicing nozzle by yarn guide lever, cutting yarn ends, sucking and holding the yarn ends in yarn end control nozzles at the both sides of the yarn splicing nozzle respectively, and splicing the yarn ends by an action of the swirling air stream in the yarn splicing nozzle while drawing out the yarn ends which are kept free under an action of suction stream in the yarn end control nozzles.

*9. A device for splicing together a first end of yarn and a second end of yarn, each of said ends including several entangled strands of fiber, said device comprising:*

*disentangling means for separating said entangled strands of fiber of each of the ends and aligning them, and for removing detached strands of fiber from said yarn ends;*

*positioning means for aligning said first and second yarn ends adjacent each other, in an overlapping manner, and facing in essentially opposite directions;*

*compressed fluid splicing means for entangling the separated strands of fiber from said first yarn end with the separated strands of fiber from said second yarn end to thereby splice said first and second yarn ends together.*

*10. A device for splicing together a first end of yarn and a second end of yarn, each of said ends including several entangled strands of fiber, said device comprising:*

*disentangling means for separating said entangled strands of fiber of each of the ends and aligning them, wherein said disentangling means includes at least one vacuum control nozzle having an opening into which said yarn ends are directed, said nozzle creating a suction force which disentangles and aligns said entangled strands of fiber;*

*positioning means for aligning said first and second yarn ends adjacent each other, in an overlapping manner, and facing in essentially opposite directions;*

*compressed fluid splicing means for entangling the separated strands of fiber from said first yarn end with the separated strands of fiber from said second yarn end to thereby splice said first and second yarn ends together.*

*11. A device as in claim 10 wherein said control nozzle includes at least one jetting hole for supplying compressed fluid to the interior of the control nozzle in a direction away from the opening to thereby create a swirling force in the control nozzle.*

*12. A device as in claim 11 wherein the strands of the yarn ends are twisted in a predetermined direction and the position of said jetting hole with respect to said control nozzle is adjustable so that a stream of compressed fluid from said jetting hole creats a swirling force upon said yarn end in a direction opposite to the twisting direction of said*

*yarn end, thereby increasing the disentangling action of the control nozzle.*

*13. A device as in claim 9 wherein said splicing means further comprises:*

*a splicing nozzle including an essentially cylindrical interior space into which the yarn ends are inserted and at least one nozzle hole for directing compressed fluid into the interior space in a direction essentially tangential to the interior space whereby compressed fluid forced through said nozzle hole creates a swirling fluid stream by which said strands of fiber of said yarn ends are entangled.*

*14. A device as in claim 13 wherein said splicing nozzle includes a slit, running along the length of the interior space, through which said yarn ends may be introduced into the interior space and through which said spliced yarn ends may be removed.*

*15. A device for splicing together a first end of yarn and a second end of yarn, each of said ends including several entangled strands of fiber, said device comprising:*

*disentangling means for separating said entangled strands of fiber of each of the ends and aligning them;*

*positioning means for aligning said first and second yarn ends adjacent each other, in an overlapping manner, and facing in essentially opposite directions, wherein said positioning means further comprises means for adjusting the length of said yarn ends to be inserted into said disentangling means;*

*compressed fluid splicing means for entangling the separated strands of fiber from said first yarn end with the separated strands of fiber from said second yarn end to thereby splice said first and second yarn ends together.*

*16. A device for splicing together a first end of yarn and a second end of yarn, each of said ends including several entangled strands of fiber, said device comprising:*

*disentangling means for separating said entangled strands of fiber of each of the ends and aligning them;*

*positioning means for aligning said first and second yarn ends adjacent each other, in an overlapping manner, and facing in essentially opposite directions;*

*compressed fluid splicing means for entangling the separated strands of fiber from said first yarn end with the separated strands of fiber from said second yarn end to thereby splice said first and second yarn ends together wherein said positioning means further comprises movable yarn guides for directing said yarn ends from said disentangling means to said splicing means.*

*17. A device for splicing together a first end of yarn and a second end of yarn, each of said ends including several entangled strands of fiber, said device comprising:*

*disentangling means for separating said entangled strands of fiber of each of the ends and aligning them;*

*positioning means for aligning said first and second yarn ends adjacent each other, in an overlapping manner, and facing in essentially opposite directions, wherein said positioning means further comprises clamping means, adjacent the disentangling means, for preventing the unravelling of at least one of said yarn ends beyond a predetermined point;*

*compressed fluid splicing means for entangling the separated strands of fiber from said first yarn end with the separated strands of fiber from said second yarn end to thereby splice said first and second yarn ends together.*

*18. A device for splicing together a first end of yarn and a second end of yarn, each of said ends including several entangled strands of fiber, said device comprising:*

*disentangling means for separating said entangled strands of fiber of each of the ends and aligning them;*

*positioning means for aligning said first and second yarn ends adjacent each other, in an overlapping manner, and facing in essentially opposite directions;*

*compressed fluid splicing means for entangling the separated strands of fiber from said first yarn end with the separated strands of fiber from said second yarn end to thereby splice said first and second yarn ends together wherein said positioning means further comprises a means for adjusting the length of said yarn ends to be inserted into said splicing means.*

*19. A method for joining together a first end of spun yarn and a second end of spun yarn, each end of said spun yarn being composed of several entangled strands of fiber, said method comprising the steps of:*

*disentangling said entangled strands of said yarn ends, wherein said disentangling step further comprises the step of removing detached strands of fiber from said yarn ends;*

*aligning said disentangled strands of said yarn ends;*

*positioning said yarn ends adjacent each other, in an overlapping manner, facing in essentially opposite directions; and*

*splicing said yarn ends together.*

*20. A method for joining together a first end of spun yarn and a second end of spun yarn, each end of said spun yarn being composed of several entangled strands of fiber, said method comprising the steps of:*

*disentangling said entangled strands of said yarn ends;*

*aligning said disentangled strands of said yarn ends;*

*positioning said yarn ends adjacent each other, in an overlapping manner, facing in essentially opposite directions; and*

*splicing said yarn ends together, wherein said splicing step comprises the steps of:*

*adjusting the length of said yarn ends to be spliced;*

*inserting the yarn ends into a splicing chamber;*

*directing compressed fluid at the yarn ends within said splicing chamber, whereby the yarn ends are intermeshed and twisted together; and*

*removing the twisted together yarn ends from said splicing chamber.*

*21. A method for joining together a first end of spun yarn and a second end of spun yarn, each end of said spun yarn being composed of several entangled strands of fiber, said method comprising the steps of:*

*disentangling said entangled strands of said yarn ends;*

*aligning said disentangled strands of said yarn ends;*

*positioning said yarn ends adjacent each other, in an overlapping manner, facing in essentially opposite directions; and*

*splicing said yarn ends together wherein said disentangling and aligning steps occur simultaneously.*

*22. A method as in claim 21 wherein said disentangling and aligning steps further comprise the steps of:*

*adjusting the length of said yarn ends to be disentangled and aligned;*

*inserting the yarn ends into at least one control nozzle;*

*subjecting the yarn ends to a suction force created by compressed fluid flowing through said control nozzle, whereby said entangled strands of said yarn ends are separated and disentangled; and*

*removing the yarn ends from said at least one control nozzle.*

*23. A method as in claim 22 wherein said step of subjecting said yarn ends to a suction force further comprises the step of directing a stream of compressed fluid at said yarn ends in a manner such that said stream impinges upon said yarn ends in a direction opposite to the twisting direction of said yarn ends.*

*24. A method as in claim 20 wherein said splicing step further comprises the step of securing at least one of the yarn ends at a position adjacent the disentangled portions to prevent the twisting action of the compressed fluid from unravelling the remainder of the yarn.*

*25. A method as in claim 20 or 23 further including the steps of controlling the pressure and timing of said compressed fluid as a function of said yarn end characteristics.*

*26. A method as in claim 22 further comprising the steps of subjecting the end fibers of said yarn ends to the suction force of said control nozzle simultaneously with said splicing step, whereby a tension corresponding to the suction force of said control nozzle is imposed on said yarn ends.*

*27. A device as in claim 10 wherein said disentangling means includes two vacuum control nozzles, one disposed on either side of said splicing means and adjacent to said splicing means.*

*28. A device for splicing together a first end of yarn and a second end of yarn, each of said ends including several entangled strands of fiber, said device comprising:*

*suction stream means;*

*disentangling means for separating said entangled strands of fiber of each of the ends and aligning them while said yarn ends are kept free by said suction stream means;*

*positioning means for aligning said first and second yarn ends adjacent each other, in an overlapping manner, and facing in essentially opposite directions;*

*compressed fluid splicing means for entangling the separated strands of fiber from said first yarn end with the separated strands of fiber from said second yarn end to thereby splice said first and second yarn ends together.*

*29. A method for joining together a first end of spun yarn and a second end of spun yarn, each end of said spun yarn being composed of several entangled strands of fiber, said method comprising the steps of:*

*holding each of said yarn ends at a point near the end thereof;*

*keeping the extreme ends of said yarn ends free under the action of a suction stream;*

*disentangling said entangled strands of said yarn ends;*

*aligning said disentangled strands of said yarn ends;*

*positioning said yarn ends adjacent each other, in an overlapping manner, facing in essentially opposite directions; and*

*splicing said yarn ends together.*

* * * * *